US012142848B2

(12) United States Patent
Kim et al.

(10) Patent No.: US 12,142,848 B2
(45) Date of Patent: Nov. 12, 2024

(54) ANTENNA PACKAGE AND IMAGE DISPLAY DEVICE INCLUDING THE SAME

(71) Applicant: DONGWOO FINE-CHEM CO., LTD., Jeollabuk-do (KR)

(72) Inventors: Jong Min Kim, Gyeonggi-do (KR); Dong Pil Park, Incheon (KR); Young Jun Lee, Seoul (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 357 days.

(21) Appl. No.: 17/500,260

(22) Filed: Oct. 13, 2021

(65) Prior Publication Data

US 2022/0037789 A1 Feb. 3, 2022

Related U.S. Application Data

(63) Continuation of application No. PCT/KR2020/005035, filed on Apr. 14, 2020.

(51) Int. Cl.
*H01Q 9/04* (2006.01)
*H01Q 1/22* (2006.01)

(52) U.S. Cl.
CPC ......... *H01Q 9/0407* (2013.01); *H01Q 1/2283* (2013.01)

(58) Field of Classification Search
CPC .... H01Q 1/2283; H01Q 1/2258; H01Q 1/241; H01Q 1/38; H01Q 1/243; H01Q 9/0407; H01Q 21/08
See application file for complete search history.

(56) References Cited

U.S. PATENT DOCUMENTS

| | | | | |
|---|---|---|---|---|
| 10,867,938 B2 * | 12/2020 | Tang | ........................ | H01L 24/19 |
| 2019/0036231 A1 * | 1/2019 | Ryu | ...................... | H01Q 25/001 |
| 2021/0168934 A1 * | 6/2021 | Lee | ...................... | H05K 1/0243 |
| 2021/0280964 A1 * | 9/2021 | Hong | ................... | H01Q 9/0414 |
| 2022/0158361 A1 * | 5/2022 | Kim | ..................... | H01Q 9/0407 |

FOREIGN PATENT DOCUMENTS

| | | |
|---|---|---|
| CN | 101728369 A | 6/2010 |
| CN | 108428693 A | 8/2018 |
| DE | 10 2017 210 989 B3 | 5/2018 |
| EP | 0 911 906 A2 | 4/1999 |

(Continued)

OTHER PUBLICATIONS

International Search Report for PCT/KR2020/005035 mailed on Aug. 7, 2020.

(Continued)

*Primary Examiner* — Seokjin Kim

(74) *Attorney, Agent, or Firm* — The PL Law Group, PLLC

(57) ABSTRACT

An antenna package according to an embodiment of the present invention includes a printed circuit board, a rear antenna unit disposed at an upper portion of the printed circuit board. The rear antenna unit may be directly mounted on the printed circuit board or integrated with the printed circuit board, and a front antenna unit disposed at a bottom side of the printed circuit board and electrically connected to the printed circuit board. The rear antenna unit and the front antenna unit are packaged using the printed circuit board to improve a radiation coverage and reliability.

18 Claims, 5 Drawing Sheets

(56) References Cited

FOREIGN PATENT DOCUMENTS

| | | | | | |
|---|---|---|---|---|---|
| EP | 3114728 | B1 | * | 6/2021 | ............. G06F 3/041 |
| JP | 2012-156943 | A | | 8/2012 | |
| JP | 2017-175540 | A | | 9/2017 | |
| KR | 10-2003-0095557 | A | | 12/2003 | |
| KR | 10-2007-0099195 | A | | 10/2007 | |
| KR | 10-1062227 | B1 | | 9/2011 | |
| KR | 10-2013-0032979 | A | | 4/2013 | |
| KR | 10-2015-0104509 | A | | 9/2015 | |
| KR | 10-101940798 | B1 | | 1/2019 | |
| KR | 10-2019-0036438 | A | | 4/2019 | |
| KR | 20200092122 | A | * | 8/2020 | ............... H01Q 1/38 |

OTHER PUBLICATIONS

Office action issued on Feb. 24, 2023 from Korean Patent Office in a counterpart Korean Patent Application No. 10-2019-0044357 (all the cited references are listed in this IDS.) (English translation is also submitted herewith.).

* cited by examiner

ANTENNA PACKAGE AND IMAGE DISPLAY DEVICE INCLUDING THE SAME

CROSS REFERENCE TO RELATED APPLICATIONS AND CLAIM OF PRIORITY

The present application is a continuation application to International Application No. PCT/KR2020/005035 with an International Filing Date of Apr. 14, 2020, which claims the benefit of Korean Patent Application Nos. 10-2019-0044357 filed on Apr. 16, 2019 at the Korean Intellectual Property Office, the disclosures of which are incorporated by reference herein in their entirety.

BACKGROUND

1. Technical Field

The present invention relates to an antenna package and an image display device including the same. More particularly, the present invention relates to an antenna package including an antenna unit and a circuit connection structure and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

According to recent developments of a mobile communication technology, an antenna capable of implementing, e.g., 3G to 5G high frequency or ultra-high frequency band communications is needed in the image display device.

However, if a driving frequency of the antenna is increased, a reception coverage may be relatively decreased and a sufficient band width may not be achieved. Additionally, a transmission loss may easily occur due to structures and environment around the antenna, thereby reducing antenna sensitivity and reliability.

Further, as the image display device becomes thinner and a display area increases, a space in which the antenna can be mounted may decrease.

SUMMARY

According to an aspect of the present invention, there is provided an antenna package having improved operational reliability and structural efficiency.

According to an aspect of the present invention, there is provided an image display device including an antenna package with improved operational reliability and structural efficiency.

(1) An antenna package, including: a printed circuit board; a rear antenna unit disposed at an upper portion of the printed circuit board, wherein the rear antenna unit is directly mounted on the printed circuit board or integrated with the printed circuit board; and a front antenna unit disposed toward a bottom side of the printed circuit board and electrically connected to the printed circuit board.

(2) The antenna package of the above (1), wherein the printed circuit board includes a rear conductive layer disposed at the upper portion, and the rear conductive layer includes the rear antenna unit.

(3) The antenna package of the above (2), wherein the rear conductive layer further includes a connection pad on which a driving integrated circuit chip is mounted.

(4) The antenna package of the above (3), wherein the connection pad is arranged in a connection area on which the driving integrated circuit chip is mounted, and a plurality of the rear antenna units are arranged around the connection area.

(5) The antenna package of the above (4), wherein a distance between the rear antenna units neighboring each other is equal to or greater than half a wavelength of a resonance frequency.

(6) The antenna package of the above (4), wherein the plurality of the rear antenna units are each adjacent to vertices of the connection area.

(7) The antenna package of the above (1), wherein the printed circuit board includes a circuit layer and a lower conductive layer therein.

(8) The antenna package of the above (7), wherein the printed circuit board further includes a first ground layer disposed between the circuit layer and the rear antenna unit.

(9) The antenna package of the above (8), wherein the printed circuit board further includes a first dielectric layer disposed between the rear antenna unit and the first ground layer.

(10) The antenna package of the above (7), wherein the printed circuit board further includes a second ground layer disposed between the circuit layer and the lower conductive layer.

(11) The antenna package of the above (10), wherein the printed circuit board further includes a second dielectric layer disposed between the lower conductive layer and the second ground layer.

(12) The antenna package of the above (7), wherein the front antenna unit is electrically connected to the lower conductive layer of the printed circuit board.

(13) The antenna package of the above (7), wherein the circuit layer includes a power line layer and a signal line layer which are connected to a man board.

(14) The antenna package of the above (13), wherein the circuit layer further includes a third ground layer disposed between the power line layer and the signal line layer.

(15) The antenna package of the above (1), wherein the front antenna unit includes a radiator, a transmission line branched from the radiator and a signal pad connected to one end portion of the transmission line.

(16) The antenna package of the above (15), wherein the front antenna unit further includes a ground pad disposed around the signal pad to be electrically separated from the signal pad and the transmission line.

(17) The antenna package of the above (16), wherein the radiator has a mesh structure.

(18) The antenna package of the above (17), wherein the front antenna unit further includes a dummy pattern formed around the radiator and having a mesh structure.

(19) An image display device including the antenna package according to embodiments as described above.

(20) The image display device of the above (19), wherein the rear antenna unit of the antenna package is disposed at a rear side of the image display device, and the front antenna unit of the antenna package is disposed at a front side including a display area of the image display device.

An antenna package according to embodiments of the present invention may include a rear antenna unit disposed at an upper portion of a printed circuit board and a front antenna unit disposed toward a bottom side of the printed circuit board.

The antenna units may be arranged at upper and lower portions of the printed circuit board, so that a beam coverage may be extended even though a driving frequency of the antenna increases, and transmission loss, signal reduction, etc., may be prevented.

The front antenna unit may serve as an AoD (Antenna on Display) disposed toward a display face of the image display device, and the rear antenna unit may serve as an AiP (Antenna in Package) mounted in a rear structure of the image display device. Signal transmission/reception and radiation through substantially an entire area of the image display device may be implemented using the antenna package. Further, AoD and AiP may be independently controlled and driven through the same antenna driving integrated circuit (IC) chip.

DETAILED DESCRIPTION OF THE EMBODIMENTS

According to exemplary embodiments of the present invention, there is provided an antenna package including a printed circuit board, a front antenna unit and a rear antenna unit and having improved radiation coverage and reliability. According to exemplary embodiments of the present invention, there is also provided an image display device including the antenna package.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
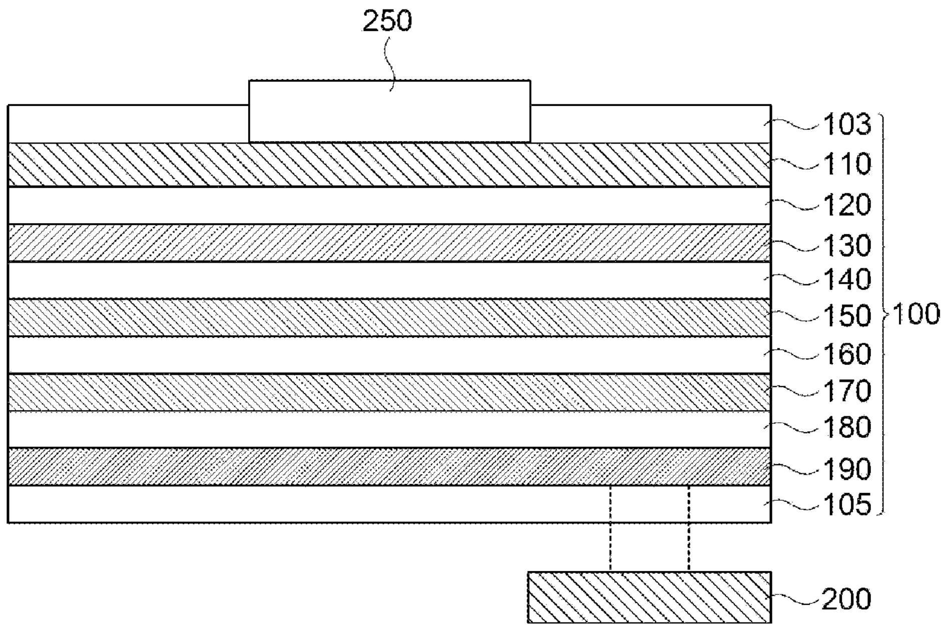
FIG. 1 is a schematic cross-sectional view illustrating an antenna package in accordance with exemplary embodiments.

The terms "upper", "lower", "bottom", "front", "rear", etc., used herein do not designate an absolute position, but are used to distinguish a relative position between elements FIG. 1 is a schematic cross-sectional view illustrating an antenna package in accordance with exemplary embodiments.

Referring to FIG. 1, the antenna package may include a printed circuit board 100, a rear conductive layer 110 disposed on or in an upper portion of the printed circuit board 100 and a front antenna unit 200 facing a bottom surface of the printed circuit board 100.

The printed circuit board 100 may include, e.g., a flexible printed circuit board (FPCB).

The printed circuit board 100 may include a circuit layer 150, an upper insulating layer 140 disposed on the circuit layer 150 and a lower insulating layer 160 disposed under the circuit layer 150. The rear conductive layer 110 may be disposed on the upper insulating layer 140, and a lower conductive layer 190 may be disposed under the lower insulating layer 160.

The rear conductive layer 110 may be disposed on the upper insulating layer 140. In exemplary embodiments, the rear conductive layer 110 may include a rear antenna unit 112 as will be described later with reference to FIG. 2. The rear conductive layer 110 may further include connection pads 114.

The rear conductive layer 110 may be disposed on the printed circuit board 100 or may be mounted on the printed circuit board 100 in a packaged form. For example, the rear conductive layer 110 may be covered by an upper coverlay film 103 of the printed circuit board 100.

A first ground layer 130 may be disposed between the rear conductive layer 110 and the circuit layer 150. A first dielectric layer 120 may be disposed between the first ground layer 130 and the rear conductive layer 110.

The first ground layer 130 may serve as a ground of the rear antenna unit 112, and the first dielectric layer 120 may serve as a dielectric layer of the rear antenna unit 112. The first ground layer 130 may be insulated and spaced apart from the circuit layer 150 by the upper insulating layer 140.

Figure 2:
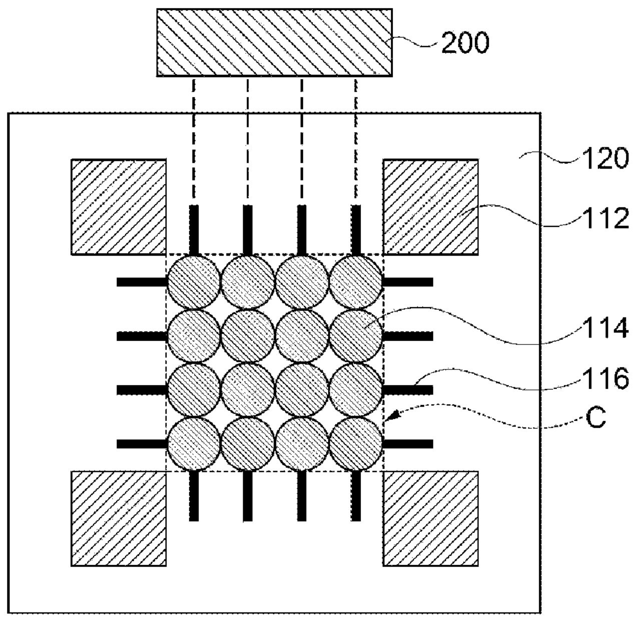
FIG. 2 is a schematic top planar view illustrating an antenna package in accordance with exemplary embodiments.

A driving integrated circuit (IC) chip 250 may be disposed on the rear conductive layer 110. For example, the upper coverlay film 103 may be partially removed to expose the connection pads 114 as illustrated in FIG. 2, and the driving IC chip 250 may be mounted on the connection pads 114.

A second ground layer 170 may be disposed between the circuit layer 150 and the lower conductive layer 190. The second ground layer 170 may be included to prevent signal interference between the circuit layer 150 and the lower conductive layer 190 and to absorb noise.

The circuit layer 150 may include wirings such as a power line and a signal line of the printed circuit board 100. The lower conductive layer 190 may include, e.g., a bonding pad for an electrical connection to a main board of the image display device.

In some embodiments, the lower conductive layer 190 may be electrically connected to the front antenna unit 200 as indicated by a dotted line in FIG. 1.

The front antenna unit 200 may be electrically connected to the conductive layer of the antenna package or the printed circuit board 100 through conductive members such as a contact, a via, an anisotropic conductive film (ACF) bonding, a soldering, a conductive clip, etc.

For example, the front antenna unit 200 may be electrically connected to the lower conductive layer 190 through a separate contact, a via or a wiring.

The lower insulating layer 160 may be disposed between the circuit layer 150 and the second ground layer 170, and a second dielectric layer 180 may be disposed between the second ground layer 170 and the lower conductive layer 190.

The lower conductive layer 190 may be covered by a lower coverlay film 105. For example, a portion of the lower coverlay film 105 may be removed to expose a bonding pad, and then the printed circuit board 100 may be connected to the main board through the bonding pad.

The rear conductive layer 110, the first and second ground layers 130 and 170, the circuit layer 150 and the lower conductive layer 190 may include a low resistance metal such as silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy thereof. These may be used alone or in combination therefrom.

The first and second dielectric layers 120 and 180 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

In some embodiments, an adhesive material such as an optically clear adhesive (OCA) or an optically clear resin (OCR) may be included in the first and second dielectric layers 120 and 180.

In some embodiments, the first and second dielectric layers 120 and 180 may include an inorganic insulating material such as silicon oxide, silicon nitride, silicon oxynitride, glass, or the like.

For example, capacitance or inductance may be formed between the rear conductive layer 110 including the rear antenna unit and the first ground layer 130 by the first dielectric layer 120, so that a frequency band at which the antenna may be driven or operated may be adjusted. In some embodiments, a dielectric constant of the first dielectric layer 120 may be adjusted in a range from about 1.5 to about 12. When the dielectric constant exceeds about 12, a driving frequency may be excessively decreased, so that driving in a desired high frequency band may not be implemented.

FIG. 2 is a schematic top planar view illustrating an antenna package in accordance with exemplary embodiments. Specifically, FIG. 2 illustrates elements and constructions of the rear conductive layer 110 of the antenna package.

Referring to FIG. 2, as described above, the rear conductive layer 110 may be disposed on the first dielectric layer 120 and may be mounted or packaged in the printed circuit board 100. The rear conductive layer 110 may include the rear antenna units 112 and the connection pads 114.

The connection pads 114 may include, e.g., conductive balls or pads for a wiring connection. In exemplary embodiments, the connection pads 114 may be arranged in an IC chip connection area C allocated on an upper surface of the printed circuit board 100 or an upper surface of the first dielectric layer 120. The driving IC chip 250 as illustrated in FIG. 1 may be mounted on the IC chip connection area C to be connected to the connection pads 114.

The rear antenna unit 112 may be an AiP (Antenna in Package) pattern substantially integrated or packaged in the printed circuit board 100. For example, the rear antenna unit 112 may be an antenna unit mounted directly on the printed circuit board 100 or in the printed circuit board 100.

The rear antenna unit 112 may be arranged around the IC chip connection area C. In exemplary embodiments, a plurality of the rear antenna units 112 may be disposed around one IC chip connection area C or the driving IC chip 250.

In an embodiment, the rear antenna units 112 may be disposed to be adjacent to each vertex of the IC chip connection area C, respectively. Accordingly, a signal loss in a transmission line for signal transmission/reception with the driving IC chip may be prevented and a distance capable of preventing an interference between the adjacent rear antenna units 112 may be achieved.

In an embodiment, a distance between the adjacent rear antenna units 112 may be equal to or greater than half a wavelength of a resonance frequency.

As described with reference to FIG. 1, the front antenna unit 200 may be disposed toward the bottom surface of the printed circuit board 100. In some embodiments, an electrical connection with the front antenna unit 200 disposed under the printed circuit board 100 may be implemented through leads 116 branching from the connection pads 114.

In some embodiments, the leads 116 may also be electrically connected to the rear antenna unit 112. In this case, driving control, feeding and signal transmission of the front antenna unit 200 and the rear antenna unit 112 may be performed together through one driving IC chip 250.

In an embodiment, the front antenna unit 200 and the rear antenna unit 112 may be independently controlled to be driven in different modes by the driving IC chip 250. For example, when the front antenna unit 200 operates in a transmit mode (Tx mode), the rear antenna unit 112 may operate in a receive mode (Rx mode) and an additional receiver may be omitted.

Figure 3:
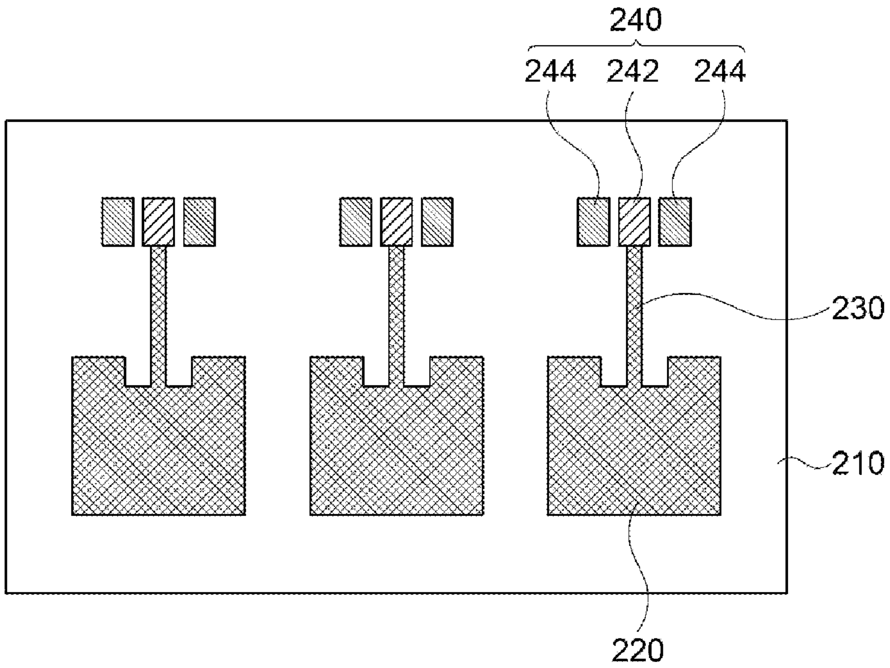
FIGS. 3 and 4 are schematic top planar views for describing a structure of a front antenna unit in accordance with exemplary embodiments.
Figure 4:
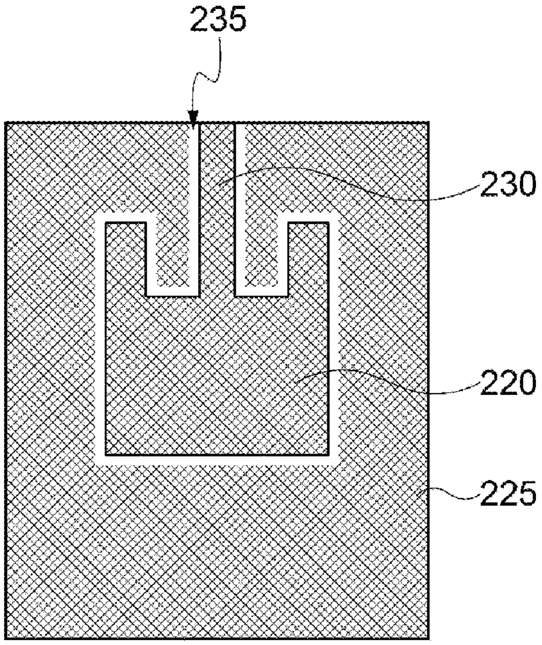

FIGS. 3 and 4 are schematic top planar views for describing a structure of a front antenna unit in accordance with exemplary embodiments.

Referring to FIG. 3, the front antenna unit 200 may be disposed on a front dielectric layer 210, and may include a radiator 220, a transmission line 230 and a pad 240. The pad 240 may include a signal pad 242 and a ground pad 244.

The front dielectric layer 210 may include a material substantially the same as or similar to that of the first dielectric layer 120 as described above. In some embodiments, an insulating layer or an insulating structure included in the image display device may serve as the front dielectric layer 210.

The radiator 220 may have, e.g., a polygonal plate shape, and the transmission line 230 may extend from a central portion of the radiator 220 to be electrically connected to the signal pad 242. The transmission line 230 may be formed as a single member substantially integral with the radiator 220.

In some embodiments, a pair of ground pads 244 may be disposed with the signal pad 242 interposed therebetween. The ground pads 244 may be electrically isolated from the signal pad 242 and the transmission line 230.

For example, the ground pads 244 may face the signal pad 242, so that a vertical radiation and a horizontal radiation may be implemented together from the front antenna unit 200.

The ground pad 244 may be electrically connected to a ground layer included in the printed circuit board 100 through, e.g., vias or contacts. For example, the ground pad 244 may be electrically connected to a ground layer closest to the front antenna unit 200 among the ground layers included in the printed circuit board 100.

The front antenna unit 200 may include a low-resistance metal or alloy substantially the same as or similar to that of the rear conductive layer 110.

For example, the front antenna unit 200 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy thereof. These may be used alone or in combination therefrom.

In an embodiment, the front antenna unit 200 may include silver (Ag) or a silver alloy (e.g., silver-palladium-copper (APC) alloy) to provide a low resistance. In an embodiment, the front antenna unit 200 may include copper (Cu) or a copper alloy (e.g., copper-calcium (CuCa) alloy) in consideration of a low resistance and a fine line width patterning.

In some embodiments, the front antenna unit 200 may include a transparent conductive oxide such as indium tin oxide (ITO), indium zinc oxide (IZO), indium zinc tin oxide (ITZO), zinc oxide (ZnOx), or the like.

In some embodiments, the front antenna unit 200 may include a multi-layered-structure of a transparent conductive oxide layer and a metal layer. For example, the front antenna unit 200 may include a double-layered structure of a transparent conductive oxide layer-metal layer or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In exemplary embodiments, the front antenna unit 200 may be an AoD (Antenna on Display) pattern disposed toward a display area of the image display device and electrically connected to the printed circuit board 100.

Referring to FIG. 4, a dummy pattern 225 having a mesh structure may be formed around the radiator 220. In an embodiment, the radiator 220 may also include a mesh structure substantially the same as or similar to that of the dummy pattern 225.

For example, the radiator 220 and the dummy pattern 225 may be separated and insulated from each other by a separation region 235 formed along a periphery of the radiator 220.

The radiator 220 and the dummy pattern 225 may be formed to include substantially the same or similar mesh structure, so that transmittance of the front antenna unit 200 may be increased and a visual recognition of the radiator 220 due to a pattern shape deviation may be prevented In some embodiments, the transmission line 230 branching from the radiator 220 may also include a mesh structure. In an embodiment, the pad 240 illustrated in FIG. 3 may have a solid pattern structure to improve a signaling speed and reduce resistance.

Figure 5:
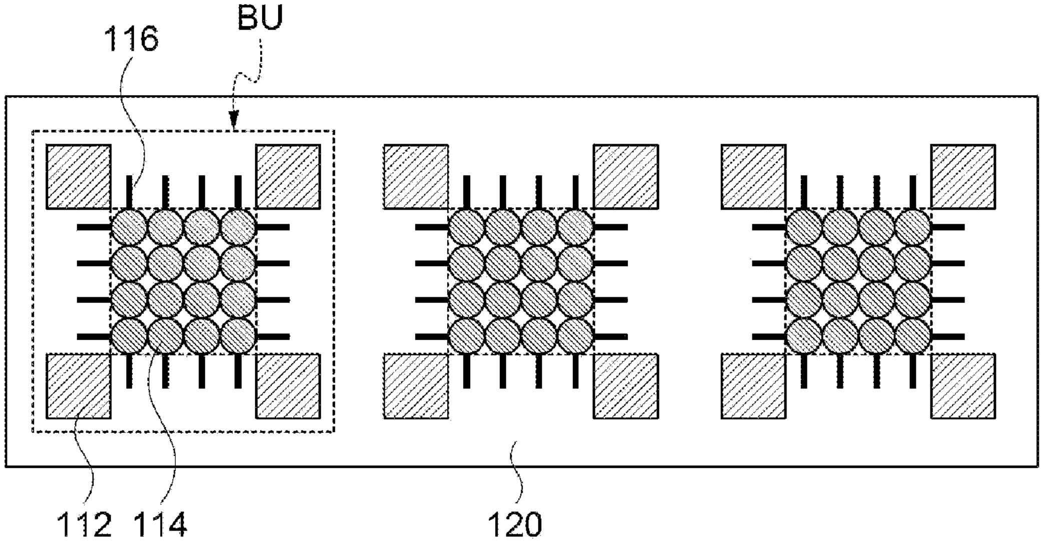
FIG. 5 is a schematic top-planar view for describing a rear antenna unit arrangement of an antenna package in accordance with some exemplary embodiments.

FIG. 5 is a schematic top-planar view for describing a rear antenna unit arrangement of an antenna package in accordance with some exemplary embodiments. For convenience of descriptions, an illustration of the driving IC chip 250 is omitted in FIG. 5.

Referring to FIG. 5, a rear antenna unit BU may be defined by the rear antenna units 112 arranged around one driving IC chip 250. In exemplary embodiments, a plurality of the rear antenna units BU may be arranged on the first dielectric layer 120 in an array form.

For example, the relatively large number of antenna units may be arranged in the array form at the rear side of the image display device that is not visually recognized by a user so that reception sensitivity and gain property may be further improved.

Figure 6:
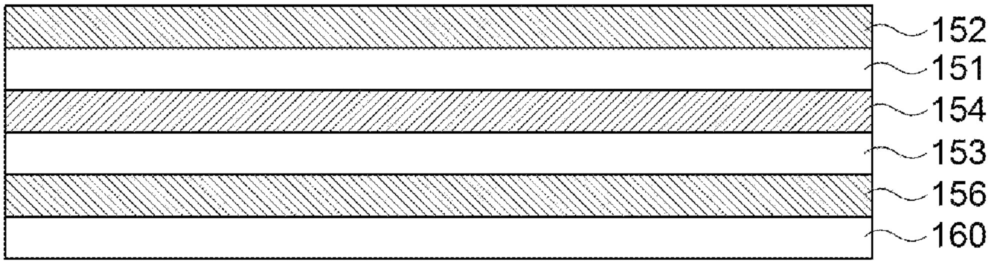
FIG. 6 is a schematic cross-sectional view illustrating a circuit layer structure of a printed circuit board included in an antenna package in accordance with some exemplary embodiments.

FIG. 6 is a schematic cross-sectional view illustrating a circuit layer structure of a printed circuit board included in an antenna package in accordance with some exemplary embodiments.

Referring to FIG. 6, the circuit layer 150 illustrated in FIG. 1 may include a power line layer 152 and a signal line layer 156. An antenna feeding or power reception from the main board may be implemented through the power line layer 152. A signal transfer between the main board and the driving IC chip 250 may be performed through the signal line layer 156.

In some embodiments, a third ground layer 154 may be disposed between the power line layer 152 and the signal line layer 156. Noise and signal interference between the signal line layer 156 and the power line layer 152 may be absorbed or removed through the third ground layer 154.

A first insulating layer 151 may be included between the power line layer 152 and the third ground layer 154, and a second insulating layer 153 may be included between the third ground layer 154 and the signal line layer 156.

The first and second insulating layers 151 and 153 may serve as a core layer of the printed circuit board 100. For example, the first and second insulating layers 151 and 153 may include a flexible resin material such as polyimide, epoxy resin, polyester, cycloolefin polymer (COP), liquid crystal polymer (LCP), etc.

Figure 7:
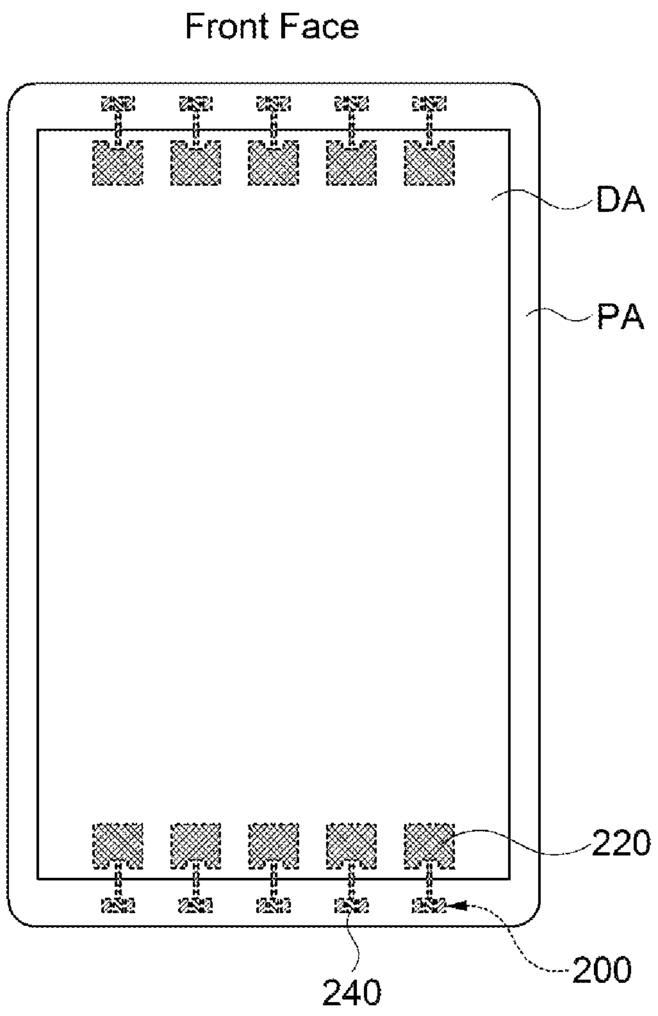
FIGS. 7 and 8 are schematic plan views illustrating an image display device in accordance with exemplary embodiments.
Figure 8:
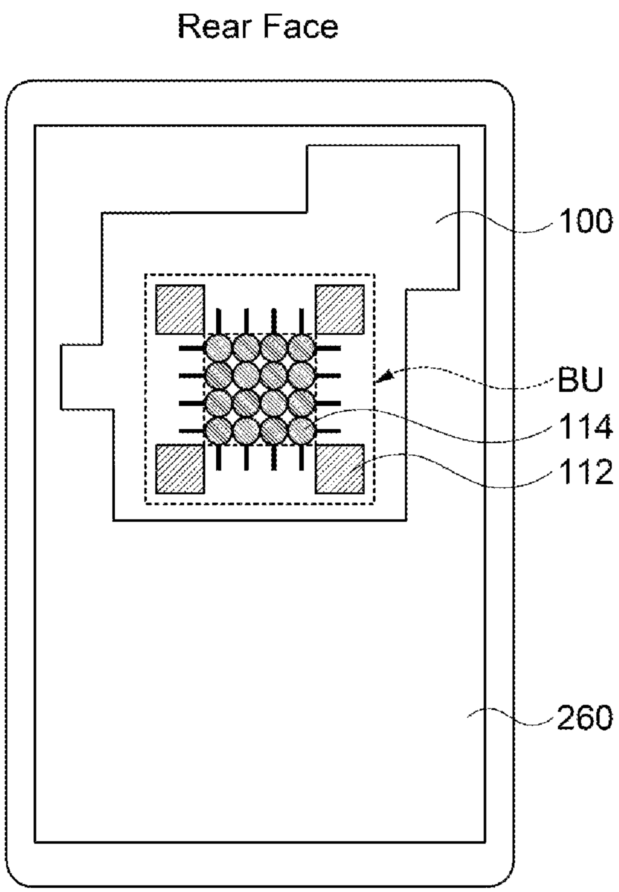

FIGS. 7 and 8 are schematic plan views illustrating an image display device in accordance with exemplary embodiments. FIG. 7 and FIG. 8 are top planar views from a front face direction and a rear face direction, respectively, of the image display device.

Referring to FIG. 7, the front antenna units 200 included in the antenna package according to exemplary embodiments may be disposed toward the front face of the image display device.

The front face of the image display device may include a display area DA and a peripheral area PA. The peripheral area PA may correspond to, e.g., a light-shielding portion or a bezel portion of the image display device.

For example, the pads 240 included in the front antenna unit 200 may be disposed in the peripheral area PA. Accordingly, the pads 240 may be prevented from being recognized by the user of the image display device.

In some embodiments, at least a portion of the radiator 220 of the front antenna unit 200 may be disposed in the display area DA. In this case, the radiator 220 may include the mesh structure as illustrated in FIG. 4, and a reduction of transmittance due to the radiator 220 may be prevented. The dummy pattern 225 having the mesh structure may be formed around the radiator 220, and the dummy pattern 225 may also be at least partially distributed in the display area DA.

Referring to FIG. 8, the rear antenna unit 112 may be disposed toward the rear face of the image display device by the printed circuit board 100. For example, the printed circuit board 100 may be mounted on a main board 260 and may be electrically connected to a circuit structure of the main board 260 through the lower conductive layer 190.

The driving IC chip 250 may be mounted on the pads 114 to define the rear antenna unit BU together with the rear antenna units 112.

In exemplary embodiments, the front antenna unit 200 may be electrically connected to the lower conductive layer 190 included in the printed circuit board 100 and may be controlled by the driving IC chip 250. Accordingly, the front antenna unit 200 may be substantially packaged with the printed circuit board 100 together with the rear antenna unit 112.

In some embodiments, the front antenna unit 200 and the rear antenna unit 112 may be driven and controlled together by the driving IC chip 250.

As described above, the antenna units may be distributed on the front and rear sides of the image display device using the printed circuit board 100, so that a radiation coverage of the antenna unit may be extended. Accordingly, a narrow band phenomenon caused by the high-frequency communication may be prevented while achieving higher radiation and signal sensitivity.

Additionally, the number of the antenna units may be increased at the rear side that may not be visually recognized by the user, so that antenna driving properties may be improved without degrading an image quality of the image display device.

What is claimed is:

1. An antenna package, comprising:

a printed circuit board comprising a rear conductive layer disposed at the upper portion;

a rear antenna unit disposed at an upper portion of the printed circuit board, wherein the rear antenna unit is directly mounted on the printed circuit board or integrated with the printed circuit board;

a front antenna unit disposed toward a bottom side of the printed circuit board and electrically connected to the printed circuit board; and a driving integrated circuit chip mounted on the rear conductive layer, wherein the front antenna unit is disposed on a front dielectric layer which is different from the printed circuit board, the rear conductive layer comprises the rear antenna unit, and a connection pad on which the driving integrated circuit chip is mounted, and the front antenna unit and the rear antenna unit are each electrically connected to a lead branching from the connection pad.

2. The antenna package of claim 1, wherein the connection pad is arranged in a connection area on which the driving integrated circuit chip is mounted, and a plurality of the rear antenna units are arranged around the connection area.

3. The antenna package of claim 2, wherein a distance between the rear antenna units neighboring each other is equal to or greater than half a wavelength of a resonance frequency.

4. The antenna package of claim 2, wherein the plurality of the rear antenna units are each adjacent to vertices of the connection area.

5. The antenna package of claim 1, wherein the printed circuit board comprises a circuit layer and a lower conductive layer therein.

6. The antenna package of claim 5, wherein the printed circuit board further comprises a first ground layer disposed between the circuit layer and the rear antenna unit.

7. The antenna package of claim 6, wherein the printed circuit board further comprises a first dielectric layer disposed between the rear antenna unit and the first ground layer.

8. The antenna package of claim 5, wherein the printed circuit board further comprises a second ground layer disposed between the circuit layer and the lower conductive layer.

9. The antenna package of claim 8, wherein the printed circuit board further comprises a second dielectric layer disposed between the lower conductive layer and the second ground layer.

10. The antenna package of claim 5, wherein the front antenna unit is electrically connected to the lower conductive layer of the printed circuit board.

11. The antenna package of claim 5, wherein the circuit layer comprises a power line layer and a signal line layer which are connected to a man board.

12. The antenna package of claim 11, wherein the circuit layer further comprises a third ground layer disposed between the power line layer and the signal line layer.

13. The antenna package of claim 1, wherein the front antenna unit comprises a radiator, a transmission line branched from the radiator and a signal pad connected to one end portion of the transmission line.

14. The antenna package of claim 13, wherein the front antenna unit further comprises a ground pad disposed around the signal pad to be electrically separated from the signal pad and the transmission line.

15. The antenna package of claim 14, wherein the radiator has a mesh structure.

16. The antenna package of claim 15, wherein the front antenna unit further comprises a dummy pattern formed around the radiator and having a mesh structure.

17. An image display device comprising the antenna package of claim 1.

18. The image display device of claim 17, wherein the rear antenna unit of the antenna package is disposed at a rear side of the image display device, and the front antenna unit of the antenna package is disposed at a front side comprising a display area of the image display device.

* * * * *